(12) United States Patent
Moon et al.

(10) Patent No.: US 10,795,192 B2
(45) Date of Patent: Oct. 6, 2020

(54) DISPLAY DEVICE

(71) Applicant: SAMSUNG DISPLAY CO., LTD., Yongin-si, Gyeonggi-do (KR)

(72) Inventors: Su-mi Moon, Suwon-si (KR); Jin-kyu Park, Yongin-si (KR); Taegyun Kim, Seoul (KR); Myunghun Baek, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/238,479

(22) Filed: Jan. 2, 2019

(65) Prior Publication Data

US 2019/0204661 A1     Jul. 4, 2019

(30) Foreign Application Priority Data

Jan. 4, 2018   (KR) .................. 10-2018-0001261

(51) Int. Cl.
*G02F 1/1333*     (2006.01)
*G02F 1/1335*     (2006.01)
(Continued)

(52) U.S. Cl.
CPC ...... *G02F 1/133308* (2013.01); *C09J 201/02* (2013.01); *G02F 1/133528* (2013.01); *H05K 5/0017* (2013.01); *C09J 2201/128* (2013.01); *G02B 6/0051* (2013.01); *G02B 6/0053* (2013.01); *G02B 6/0055* (2013.01); (Continued)

(58) Field of Classification Search
CPC ......... G02F 1/133308; G02F 1/133528; G02F 2202/28; G02F 1/133603; G02F 2001/133317; C09J 201/02; C09J 2201/128; H05K 5/0017; G02B 6/0073; (Continued)

(56) References Cited

U.S. PATENT DOCUMENTS 6,204,906 B1 *   3/2001   Tannas, Jr. ............ G02F 1/1339
                                                            349/153
9,123,593 B2     9/2015   Kang et al.
(Continued)

FOREIGN PATENT DOCUMENTS

KR     10-0212735 B1     8/1999
KR     10-1431752 B1     8/2014
(Continued)

*Primary Examiner* — Charles S Chang
(74) *Attorney, Agent, or Firm* — Lewis Roca Rothgerber Christie LLP

(57) ABSTRACT

A display device including: a display panel including a first substrate and a second substrate that are coupled to and face each other; a first polarizing plate attached to the second substrate of the display panel; a second polarizing plate attached to the first substrate of the display panel; and a side cover layer. The first polarizing plate has a first extended portion that extends outwardly beyond an end portion of the second substrate, and the second polarizing plate has a second extended portion that extends outwardly beyond an end portion of the first substrate. The side cover layer is between the first and second extended portions of the first and second polarizing plates and covers a first side surface of the first substrate and a second side surface of the second substrate that are near the first and second extended portions, respectively.

21 Claims, 8 Drawing Sheets

(51) Int. Cl.
*C09J 201/02* (2006.01)
*H05K 5/00* (2006.01)
*F21V 8/00* (2006.01)
*G02F 1/13357* (2006.01)

(52) U.S. Cl.
CPC ...... *G02B 6/0073* (2013.01); *G02F 1/133603* (2013.01); *G02F 2001/133317* (2013.01); *G02F 2202/28* (2013.01)

(58) Field of Classification Search
CPC ... G02B 6/0055; G02B 6/0051; G02B 6/0053
USPC .................................................. 349/149–152
See application file for complete search history.

(56) References Cited

U.S. PATENT DOCUMENTS

| | | |
|---|---|---|
| 9,445,516 B2 | 9/2016 | Yoon et al. |
| 9,445,518 B2 | 9/2016 | Yoon et al. |
| 9,516,771 B2 | 12/2016 | Byeon |
| 2014/0204293 A1* | 7/2014 | Kim .................. G02F 1/133351 349/15 |
| 2016/0062182 A1* | 3/2016 | Cho ...................... G02F 1/1339 359/483.01 |
| 2016/0349567 A1 | 12/2016 | Kwon et al. |
| 2017/0371197 A1* | 12/2017 | Hirabayashi ...... G02F 1/133512 |

FOREIGN PATENT DOCUMENTS

| | | |
|---|---|---|
| KR | 10-2014-0136238 A | 11/2014 |
| KR | 10-2014-0141165 A | 12/2014 |
| KR | 10-2015-0145152 A | 12/2015 |
| KR | 10-2016-0141058 A | 12/2016 |
| KR | 10-1728488 B1 | 4/2017 |
| KR | 10-2017-0050512 A | 5/2017 |
| KR | 10-2017-0079576 A | 7/2017 |

* cited by examiner

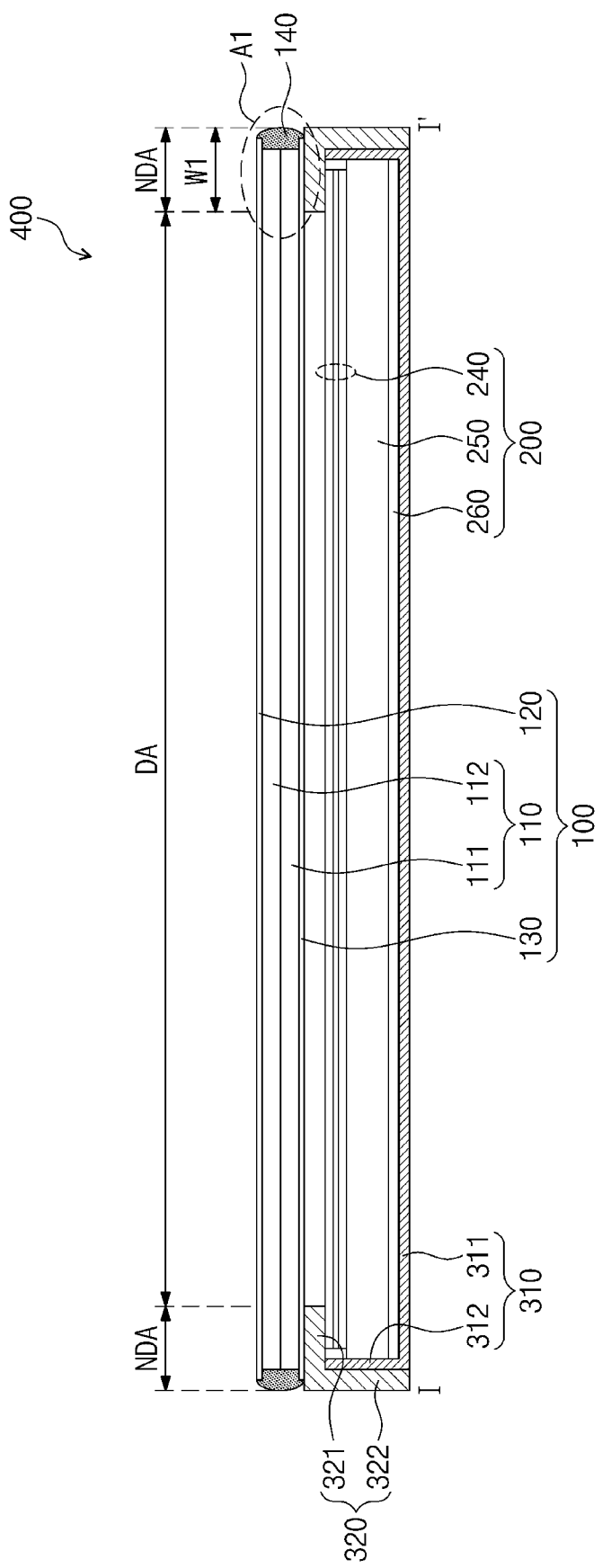

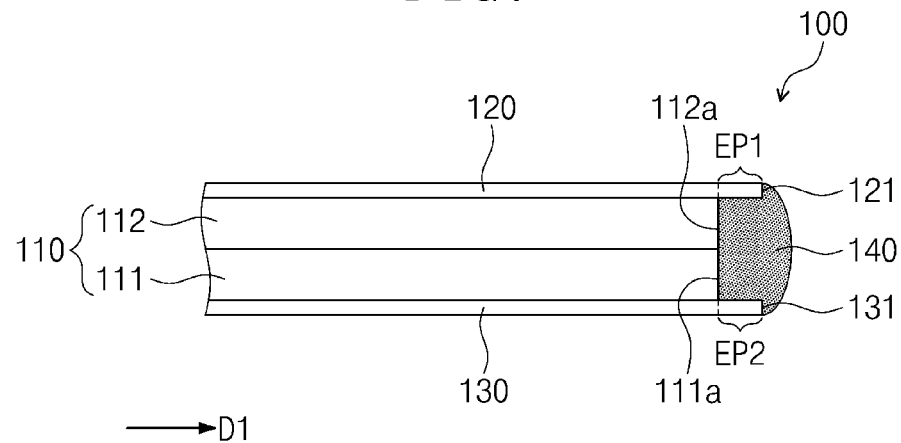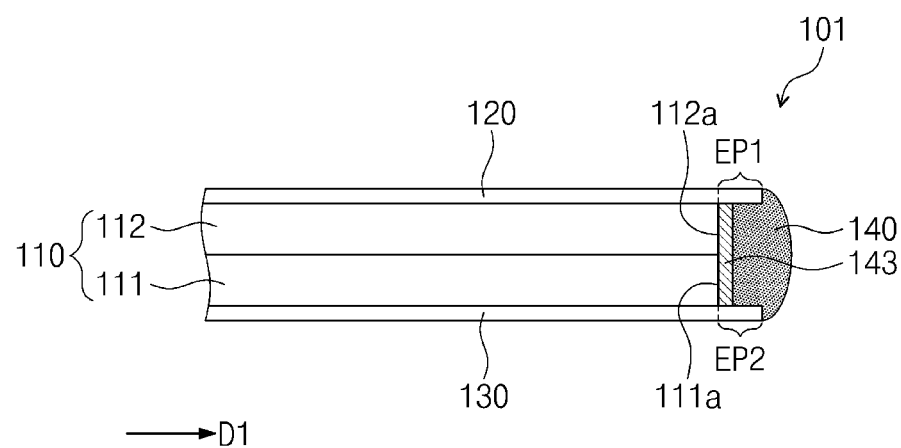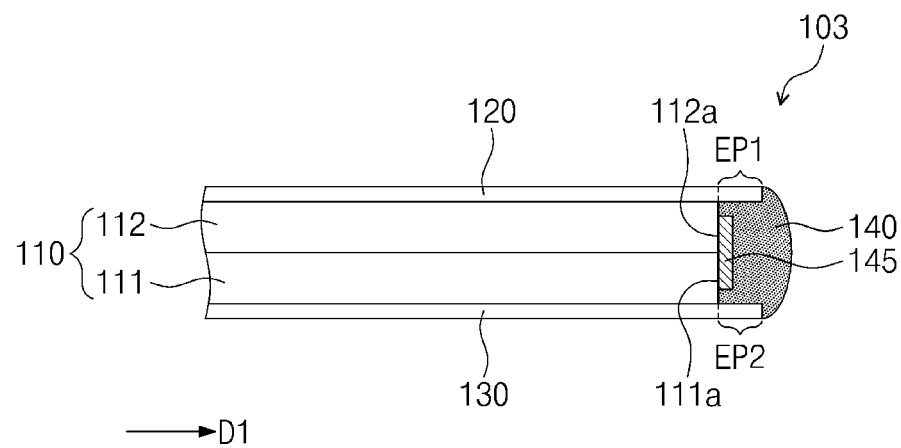

DISPLAY DEVICE

CROSS-REFERENCE TO RELATED APPLICATION

This application claims priority to and the benefit of Korean Patent Application No. 10-2018-0001261, filed on Jan. 4, 2018 in the Korean Intellectual Property Office (KIPO), the entire content of which is hereby incorporated by reference.

BACKGROUND

1. Field

Aspects of embodiments of the present disclosure relate to a display device.

2. Description of the Related Art

In general, a flat panel display device includes a liquid crystal display device or an organic light emitting display device. Due to its thin and light properties, the flat panel display device is widely used as a display device in televisions, monitors, notebook computers, tablet computers, smart phones, portable displays, and portable information devices.

In recent years, techniques have been developed to reduce an area of the case (i.e., a bezel width) located on a front surface of a flat panel display device to provide better product appearance and to allow a user to have an increased sense of immersion in a screen.

In order to achieve these characteristics for the product appearance, a narrow bezel type or borderless type flat panel display device, whose outer edge region is reduced or removed, is being developed.

SUMMARY

A relatively narrow bezel or borderless flat panel display device suffers from low edge strength, and thus, the strength of the edge portion of the display device should be increased.

Some embodiments of the present invention provide a display device having reduced bezel width and including a display panel having an edge portion with increased strength.

According to an embodiment of the present invention, a display device includes: a display panel including a first substrate and a second substrate that are coupled to and face each other; a first polarizing plate attached to the second substrate of the display panel; a second polarizing plate attached to the first substrate of the display panel; and a side cover layer. The first polarizing plate has a first extended portion that extends outwardly beyond an end portion of the second substrate, and the second polarizing plate has a second extended portion that extends outwardly beyond an end portion of the first substrate. The side cover layer is between the first and second extended portions of the first and second polarizing plates and covers a first side surface of the first substrate and a second side surface of the second substrate that are near the first and second extended portions, respectively.

The side cover layer may cover a side surface of the first extended portion and a side surface of the second extended portion.

The side cover layer may include an ultraviolet light (UV) curable resin and a colored material.

A width of each of the first and second extended portion may be in a range from 0.1 mm to 1 mm.

The side cover layer may have a thickness in a range from 0.25 mm to 1 mm.

The display device may further include an intermediate buffer layer between the side cover layer and the first and second side surfaces.

The intermediate buffer layer may include a strength enhancing layer and an adhesive layer attaching the strength enhancing layer to the first and second side surfaces, and the strength enhancing layer may include at least one of metal, acrylic, or glass.

The intermediate buffer layer may include an adhesive tape attached to the first and second side surfaces.

The intermediate buffer layer may be on the first and second side surfaces and may have a length shorter than a sum of vertical thicknesses of the first and second side surfaces.

A top surface of the intermediate buffer layer may be covered by the first extended portion, a side surface of the intermediate buffer layer may be covered by the side cover layer, and a bottom surface of the intermediate buffer layer may be covered by the second extended portion.

According to another embodiment of the present invention, a display device includes: a display panel including a first substrate and a second substrate coupled to and facing each other; a first polarizing plate attached to the second substrate of the display panel; a second polarizing plate attached to the first substrate of the display panel; a side cover layer; and a supporting layer supporting the side cover layer and a portion of the first substrate. The first polarizing plate has a first extended portion that extends outwardly beyond an end portion of the second substrate, and the side cover layer is below the first extended portion and covers a first side surface of the first substrate and a second side surface of the second substrate that are near the first and second extended portions, respectively.

The supporting layer may include: a first supporting layer attached to a bottom surface of the side cover layer and a bottom surface of the first substrate; and a second supporting layer attached to a bottom surface of the first supporting layer.

The first supporting layer may include a double-sided adhesive tape, and the second supporting layer may include at least one of metal, acrylic, or glass.

The supporting layer may include a single-sided adhesive tape attached to a bottom surface of the side cover layer and a bottom surface of the second substrate.

The display device may further include an intermediate buffer layer between the side cover layer and the first and second side surfaces.

The intermediate buffer layer may include an adhesive tape attached to the first and second side surfaces.

The side cover layer may have a thickness in a range from 0.05 mm to 0.3 mm.

The side cover layer may include a UV curable resin and a colored material.

The first extended portion may have width in a range from 0.1 mm to 1 mm.

The side cover layer may have a thickness in a range from 0.25 mm to 1 mm.

BRIEF DESCRIPTION OF THE DRAWINGS

Example embodiments of the present invention will be more clearly understood from the following brief description, taken in conjunction with the accompanying drawings. The accompanying drawings represent non-limiting, example embodiments as described herein.

FIG. 3 is a sectional view taken along the line I-I' of FIG. 2.

FIG. 4 is an enlarged sectional view illustrating the portion A1 of FIG. 3.

FIG. 5 is a sectional view illustrating a portion of a display panel module according to an exemplary embodiment of the present invention.

FIG. 6 is a sectional view illustrating a portion of a display panel module according to another exemplary embodiment of the present invention.

Figure 1:
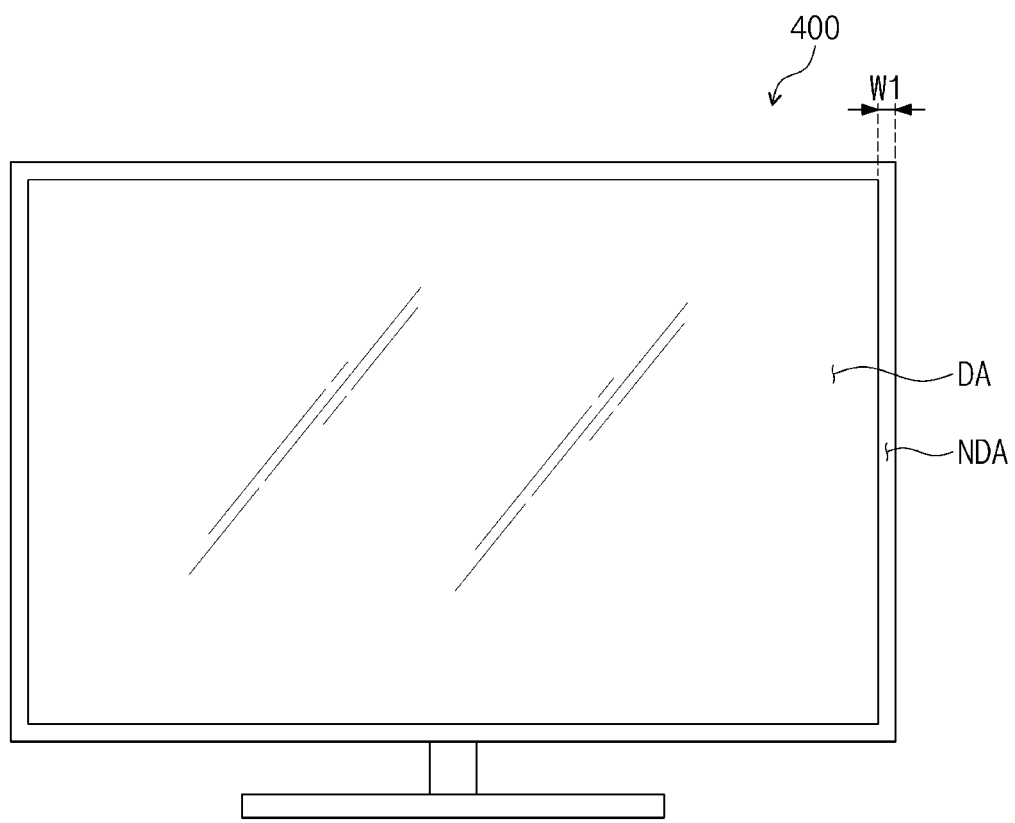
FIG. 1 is a plan view illustrating a display device according to an exemplary embodiment of the present invention.

It should be noted that these figures are intended to illustrate general characteristics of methods, structure, and/or materials utilized in certain example embodiments and to supplement the written description provided below. These drawings may not be to scale and may not precisely reflect the precise structural or performance characteristics of any illustrated embodiment and, thus, should not be interpreted as defining or limiting the range of values or properties encompassed by example embodiments. For example, relative thicknesses and positioning of layers, regions, and/or structural elements may be reduced or exaggerated for clarity. The use of similar or identical reference numbers in the various drawings is intended to indicate similar or identical elements or features.

DETAILED DESCRIPTION

Example embodiments of the present invention will now be described more fully with reference to the accompanying drawings, in which example embodiments are shown. The present invention may, however, be embodied in many different forms and should not be construed as being limited to the example embodiments set forth herein; rather, these embodiments are provided so that this disclosure will be thorough and complete and will fully convey the concept of present invention to those of ordinary skill in the art.

It will be understood that when an element is referred to as being "on," "connected," or "coupled" to another element, it can be directly on, connected, or coupled to the other element or intervening elements may be present. When an element is referred to as being "directly on," "directly connected," or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on," etc.). As used herein, the term "and/or" includes any and all combinations of one or more of the associated listed items.

It will be understood that, although the terms "first", "second", etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein should be interpreted accordingly.

The use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the term "substantially," "about," and similar terms are used as terms of approximation and not as terms of degree, and are intended to account for the inherent variations in measured or calculated values that would be recognized by those of ordinary skill in the art.

The terminology used herein is for the purpose of describing example embodiments only and is not intended to be limiting of the present invention. As used herein, the singular forms "a" and "an" are intended to include the plural forms as well, unless the context clearly indicates otherwise. It will be further understood that the terms "having," "comprises", "comprising", "includes," "including," and/or variations thereof, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112 (a) and 35 U.S.C. § 132(a).

Figure 2:
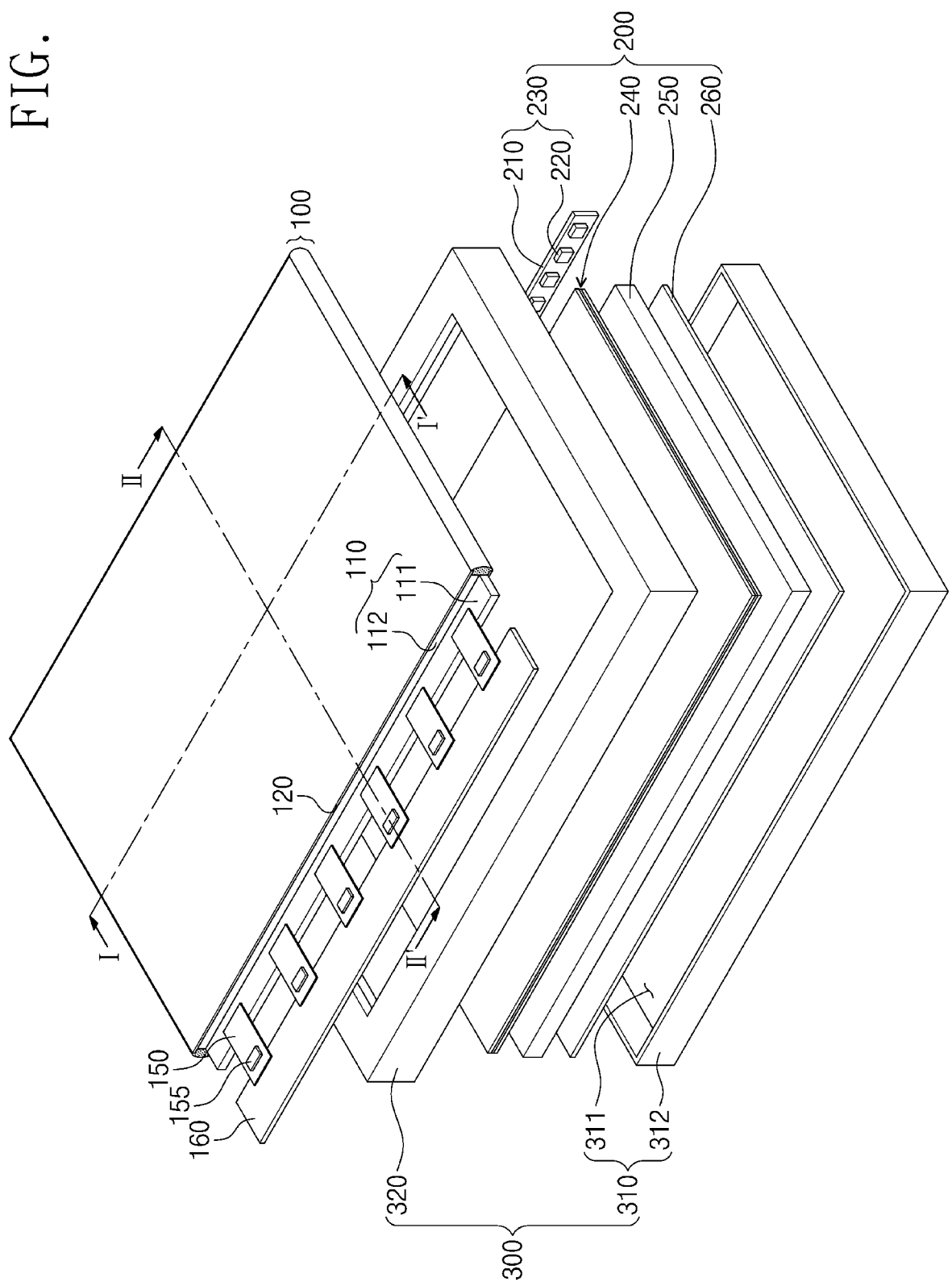
FIG. 2 is an exploded perspective view of the display device shown in FIG. 1.

FIG. 1 is a plan view illustrating a display device according to an exemplary embodiment of the present invention, FIG. 2 is an exploded perspective view of the display device shown in FIG. 1, and FIG. 3 is a sectional view taken along the line I-I' of FIG. 2.

Referring to FIGS. 1 and 2, a display device 400 according to an exemplary embodiment of the present invention may include a display panel module 100 configured to display an image, a backlight unit (e.g., a backlight) 200 configured to provide light to the display panel module 100, and a receiving module (e.g., a case or frame) 300 configured to accommodate the backlight unit 200 and to support the display panel module 100.

The display panel module 100 may include a display panel 110, a first polarizing plate 120 attached to a top surface of the display panel 110, and a second polarizing plate 130 attached to a bottom surface of the display panel 110. In some embodiments, the display panel 110 may be a liquid crystal display panel including a liquid crystal layer. In such an embodiment, the display panel 110 may include a first substrate 111, a second substrate 112 facing the first substrate 111, and a liquid crystal layer provided between the first substrate 111 and the second substrate 112.

However, the present invention is not limited to the above example, and in other embodiments, the display panel 110 may be, for example, an electrowetting display panel including an electrowetting layer, an electrophoresis display panel including an electrophoresis layer, or an organic light emitting display panel including organic light emitting devices.

The display panel 110 may include a plurality of pixels to display an image. The pixels may be connected to a plurality of gate lines and a plurality of data lines. The pixels may be configured to display gray levels corresponding to data voltages provided through the data lines in response to gate signals provided through the gate lines.

Each of the pixels may be configured to display one of the primary colors. The primary colors may include red, green, and blue colors. However, the present invention is not limited to this example, and the primary colors may further include various colors, such as white, yellow, cyan, and magenta.

In some embodiments, the first substrate 111 may be a substrate on which the pixels are arranged (or are formed), and the second substrate 112 may be a substrate on which a color filter layer for displaying colors is disposed. However, the present invention is not limited thereto, and in other embodiments, the second substrate 112 may be the substrate on which the pixels are arranged, and the first substrate 111 may be the substrate on which the color filter layer for displaying colors is disposed.

The first and second substrates 111 and 112 may be sequentially provided in a direction away from the backlight unit 200. For example, the first substrate 111 may be is disposed relatively closer to the backlight unit 200 than the second substrate 112 is.

The display panel module 100 may include a display region DA, at where an image is displayed, and a non-display region NDA, which is provided around the display region DA (e.g., around a periphery of the display region DA). Here, a width W1 of the non-display region NDA may be defined as a bezel width of the display device 400.

The display panel module 100 may further include flexible circuit films 150, which are connected to the display panel 110, and driving chips (e.g., driving ICs) 155, which are respectively mounted on the flexible circuit films 150. In addition, the display panel module 100 may further include a printed circuit board 160 connected to the flexible circuit films 150. Some of signals that are output from the printed circuit board 160 may be provided to the driving chips 155 through the flexible circuit films 150 and others of the signals may be directly provided to the display panel 110 through the flexible circuit films 150. Furthermore, signals that are output from the driving chips 155 may be provided to the display panel 110 through the flexible circuit films 150.

In some embodiments, the first substrate 111 may include an edge portion that laterally extends beyond an edge of the second substrate 112. Accordingly, as shown in FIG. 2, the flexible circuit films 150 may be attached to the exposed edge portion of the first substrate 111 that does not overlap the second substrate 112. However, the present invention is not limited to the above example.

Referring to FIGS. 2 and 3, the backlight unit 200 may be an edge-type backlight unit. However, the present invention is not limited thereto, and in other embodiments, the backlight unit 200 may be a direct-type backlight unit.

The backlight unit 200 may include an optical sheet 240, a light guide plate 250, a light source 230, and a reflection sheet 260. The light guide plate 250 may be a tetragonal or rectangular plate. The light source 230 may be provided near the light guide plate 250 to face a side surface of the light guide plate 250. The reflection sheet 260 may be provided below the light guide plate 250, and the optical sheet 240 may be provided on (e.g., above) the light guide plate 250.

The light source 230 may be configured to generate light, which is used to display an image on the display panel 110. The light generated by the light source 230 may be incident onto the side surface of the light guide plate 250. In this sense, the side surface of the light guide plate 250 may be referred to as "an incident surface". The light guide plate 250 may be configured to allow the light, which is provided from the light source 230, to propagate toward the display panel 110 (e.g., in an upward direction).

The light source 230 may include a light source substrate 210, which is provided to face the incident surface of the light guide plate 250, and a plurality of light-emitting diodes 220, which are mounted on the light source substrate 210. The light-emitting diodes 220 may be spaced apart from each other by the same or a substantially similar distance (e.g., the light-emitting diodes 220 may be regularly arranged on the light source substrate 210). The light-emitting diodes 220 may have a light-emitting surface facing the incident surface of the light guide plate 250. The light-emitting diodes 220 may be configured to generate light that is incident on the incident surface of the light guide plate 250.

The reflection sheet 260 may reflect light, which is emitted from the light guide plate 250 and propagates in a downward direction, in an upward direction. The optical sheet 240 may include a diffusion sheet, a prism sheet on the diffusion sheet, and a protection sheet on the prism sheet. The diffusion sheet may be configured to diffuse light that is provided from the light guide plate 250. The prism sheet may be configured to condense light, which is diffused by the diffusion sheet and propagates in a direction normal to the top surface of the display panel 110. Furthermore, the prism sheet may be configured to allow the light propagating in the upward direction to be incident into the display panel 110 with a uniform or substantially uniform brightness distribution. The protection sheet may be configured to protect the prism sheet.

The receiving module 300 may include a first receiving member (e.g., a first storage member) 310, which accommodates the backlight unit 200, and a second receiving member (e.g., a second storage member) 320, which supports the display panel 110. In some embodiments, the first receiving member 310 may be defined as a bottom chassis, and the second receiving member 320 may be defined as a mold frame.

The first receiving member 310 may include a bottom portion 311 and sidewall portions 312, which upwardly extend from side surfaces of the bottom portion 311. The bottom portion 311 may define a bottom surface of the first receiving member 310, and the sidewall portions 312 may define side surfaces of the first receiving member 310. The bottom portion 311 may have a rectangular shape. The backlight unit 200 may be accommodated in a space defined by the bottom portion 311 and the sidewall portions 312.

The second receiving member 320 may be a rectangular frame and may be provided between the display panel 110 and the backlight unit 200. The second receiving member 320 may be placed at a position corresponding to that of the non-display region NDA of the display panel 110 to support an edge portion of the display panel 110. The edge portion of the display panel 110 may be a border of the display panel 110 and may be a part of the non-display region NDA of the display panel 110.

The second receiving member 320 may include a supporting portion 321, which supports an edge portion of the display panel 110. As shown in FIG. 2, the second receiving member 320 may further include an extended portion 322, which extends from the supporting portion 321 to face the sidewall portions 312 of the first receiving member 310. However, in other embodiments, the extended portion 322 may be omitted to reduce the bezel width W1 of the display device 400.

Referring to FIG. 3 and as described above, the backlight unit 200 may be placed in (or accommodated in) the first receiving member 310. For example, the first receiving member 310 may be configured to store (or accommodate) the reflection sheet 260, the light guide plate 250, the optical sheet 240, and the light source 230.

The supporting portion 321 of the second receiving member 320 may be mounted on the backlight unit 200 and the sidewall portions 312 of the first receiving member 310, and the extended portion 322 may be provided such that its inner side surface faces an outer side surface of the sidewall portions 312. Because the edge portion of the display panel 110 is provided on the supporting portion 321, the display panel 110 may be supported by the second receiving member 320.

FIG. 4 is an enlarged sectional view illustrating the portion A1 of FIG. 3.

Referring to FIGS. 3 and 4, the display panel module 100 may further include a side cover layer 140 covering the side surface of the display panel 110 in addition to the first polarizing plate 120 attached to the top surface of the display panel 110 and the second polarizing plate 130 attached to the bottom surface of the display panel 110 (e.g., the side cover layer 140 may also cover the first and second polarizing plates 120 and 130).

The first polarizing plate 120 may have a length longer than that of the display panel 110 in a first direction D1 to include a first extended portion EP1, which is provided outside the top surface of the display panel 110, and the second polarizing plate 130 may have a length longer than that of the display panel 110 in the first direction D1 to include a second extended portion EP2, which is provided outside the bottom surface of the display panel 110. The top surface of the display panel 110 may be a top surface of the second substrate 112, and the bottom surface of the display panel 110 may be a bottom surface of the first substrate 111.

In some embodiments, a width of each of the first and second extended portions EP1 and EP2 in the first direction D1 may be in a range from about 0.1 mm to about 1 mm. Furthermore, the first and second extended portions EP1 and EP2 may have the same or a substantially similar width as each other or different widths from each other.

The side cover layer 140 may be provided between the first and second extended portions EP1 and EP2 of the first and second polarizing plates 120 and 130 to cover a first side surface 111a of the first substrate 111 and a second side surface 112a of the second substrate 112. In addition, as shown in FIG. 4, the side cover layer 140 may be provided to cover a side surface 121 of the first polarizing plate 120 and to cover a side surface 131 of the second polarizing plate 130.

In some embodiments, the side cover layer 140 may have a width in a range from about 0.25 mm to about 1 mm in the first direction D1.

The side cover layer 140 may be include (or may be formed of) an ultraviolet light (UV) curable resin. In addition, the side cover layer 140 may include a colored material (e.g., a black, gray, blue, or dark blue material) or a light-blocking material, which can prevent or substantially reduce light from leaking through the side surface of the display panel 110.

In an embodiment in which the side cover layer 140 is formed of a UV curable material, the formation of the side cover layer 140 may include providing the UV curable material in a region between the first and second extended portions EP1 and EP2 and irradiating an ultraviolet light to cure the UV curable material.

The following Table 1 shows numerical results of strength characteristics of display panels according to an Embodiment 1 and a Comparative example. In Embodiment 1, the side cover layer 140 was provided between the first and second extended portions EP1 and EP2. By contrast, in the Comparative example, only one of the first and second polarizing plates 120 and 130 (e.g., the first polarizing plate 120) had an extended structure, and the side cover layer 140 was provided below the extended portion of the one of the first and second polarizing plates 120 and 130.

TABLE 1

| Ball weight | Height | Energy (mJ) | Comparative example | Embodiment 1 |
| --- | --- | --- | --- | --- |
| 110 g (50 g) | 2.3 (5) cm | 25 | 0/5 | 0/5 |
|  | 6.8 (15) cm | 74 | 0/5 | 0/5 |
|  | 11.4 (25) cm | 120 | 1/5 (20%) | 0/5 |
|  | 18.2 (40) cm | 196 | 1/5 | 0/5 |

TABLE 1-continued

| Ball weight | Height | Energy (mJ) | Comparative example | Embodiment 1 |
|---|---|---|---|---|
| | 20.5 (45) cm | 221 | 1/5 | 0/5 |
| | 22.7 (50) cm | 245 | — | 0/5 |
| | 25.0 (55) cm | 270 | — | 1/5 (20%) |

In Embodiment 1, a width of each of the first and second extended portions EP1 and EP2 was 0.4 mm, and a thickness of the side cover layer 140 was 0.5 mm. In the Comparative example, the extended portion had the same width as that of the first and second extended portions EP1 and EP2, and a thickness of the side cover layer was 0.5 mm.

In the experiment shown in Table 1, in order to measure strength of the edge portion of the display panel module 100, a ball was dropped on an edge portion of the display panel module 100 under the above-described conditions. In the experiment, the ball (110 g or 50 g) was dropped from several different initial heights and it was observed whether or not the glass of the display panel was broken. In the experiments using the 50 g ball, the initial position of the 50 g ball was higher than in the experiments using the 110 g ball.

As shown in Table 1, Embodiment 1 withstood about 2.5 times the energy before the glass of the display panel module 100 broke when compared to the Comparative example.

FIG. 5 is a sectional view illustrating a portion of a display panel module according to another exemplary embodiment of the present invention.

Referring to FIG. 5, a display panel module 101 according to another exemplary embodiment of the present invention may further include an intermediate buffer layer 143 interposed between the side cover layer 140 and the side surface of the display panel 110. The intermediate buffer layer 143 may be positioned between the first extended portion EP1 of the first polarizing plate 120 and the second extended portion EP2 of the second polarizing plate 130.

Thus, a top surface of the intermediate buffer layer 143 may be covered by the first extended portion EP1, a side surface of the intermediate buffer layer 143 may be covered by the side cover layer 140, and a bottom surface of the intermediate buffer layer 143 may be covered by the second extended portion EP2.

In some embodiments, the intermediate buffer layer 143 may be attached to the first side surface 111a and the second side surface 112a and may be large enough to entirely cover the first side surface 111a of the first substrate 111 and the second side surface 112a of the second substrate 112. The intermediate buffer layer 143 may include (or may be) an adhesive tape. For example, the intermediate buffer layer 143 may have a thickness of about 0.2 mm.

In some embodiments, the intermediate buffer layer 143 may include a strength enhancing layer including (or formed of) metal, acrylic, or glass and an adhesive layer to attach the strength enhancing layer to the first and second side surfaces 111a and 112a.

FIG. 6 is a sectional view illustrating a portion of a display panel module according to another exemplary embodiment of the present invention.

Referring to FIG. 6, in a display panel module 103 according to another exemplary embodiment of the present invention, an intermediate buffer layer 145 may be provided on the first and second side surfaces 111a and 112a and may be shorter than a sum of vertical thicknesses of the first and second substrates 111 and 112. In some embodiments, the intermediate buffer layer 145 may be attached to the first side surface 111a and the second side surface 112a to partially cover the first side surface 111a of the first substrate 111 and the second side surface 112a of the second substrate 112.

All of top, side, and bottom surfaces of the intermediate buffer layer 145 may be covered by the side cover layer 140.

The intermediate buffer layer 145 may be an adhesive tape having a thickness of about 0.2 mm.

Figure 7:
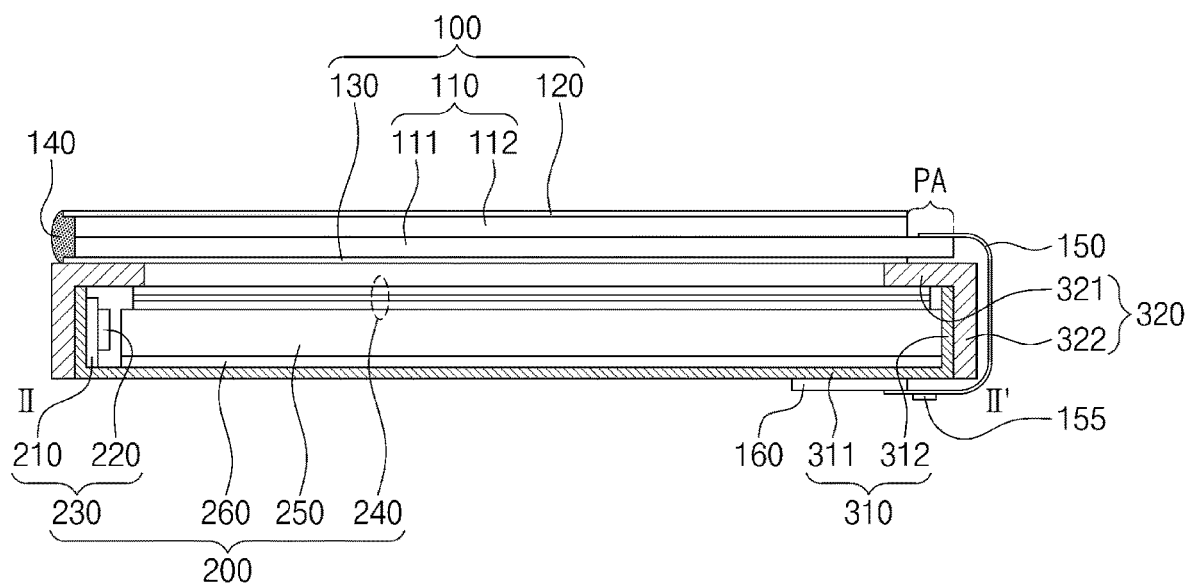
FIG. 7 is a sectional view taken along the line II-II' of FIG. 2.

FIG. 7 is a sectional view taken along the line II-II' of FIG. 2.

Referring to FIG. 7, when the display device 400 is assembled, the flexible circuit films 150 may be bent and the printed circuit board 160 connected to the flexible circuit films 150 may be provided on a rear surface of the bottom portion 311 of the first receiving member 310.

The flexible circuit films 150 may be bent around an outer side surface of the extended portion 322 of the second receiving member 320 adjacent to the sidewall portion 312 and may be bent to be at a lower portion of the bottom portion 311 adjacent to the extended portion 322. Because the flexible circuit films 150 is bent, the printed circuit board 160 connected to the flexible circuit films 150 may be positioned below the bottom portion 311 of the first receiving member 310. The driving chips 155, which are respectively mounted on the flexible circuit films 150, may be provided on the rear surface of the bottom portion 311 of the first receiving member 310 and adjacent to the printed circuit board 160.

In some embodiments, the driving chips 155 may be provided on the extended portion 322, and in such embodiments, a bezel width of the display device may be increased by a thickness of the driving chips 155 compared to an embodiment in which the driving chips 155 are provided on the rear surface of the bottom portion 311.

A pad region PA, to which the flexible circuit films 150 are attached, may be defined on the first substrate 111. The first substrate 111 may include an end portion, which extends outwardly beyond an edge portion of the second substrate 112 and is provided near the pad region PA. Thus, the top surface of the first substrate 111 may not overlap the second substrate 112 in the pad region PA, and the flexible circuit films 150 may be attached to a region of the top surface of the first substrate 111 corresponding to the pad region PA.

As described above, the flexible circuit films 150 may be bent to enclose the end portion of the first substrate 111. Thus, in the pad region PA, to which the flexible circuit films 150 are attached, the side surface of the display panel 110 may not be covered with the side cover layer 140.

In some embodiments, the side cover layer 140 may cover the side surface of the second substrate 112 and may be provided near the pad region PA. In such embodiments, to increase strength of the side cover layer 140, an end portion of the first polarizing plate 120 may extend outwardly to cover the top surface of the side cover layer 140 in the pad region PA.

Figure 8:
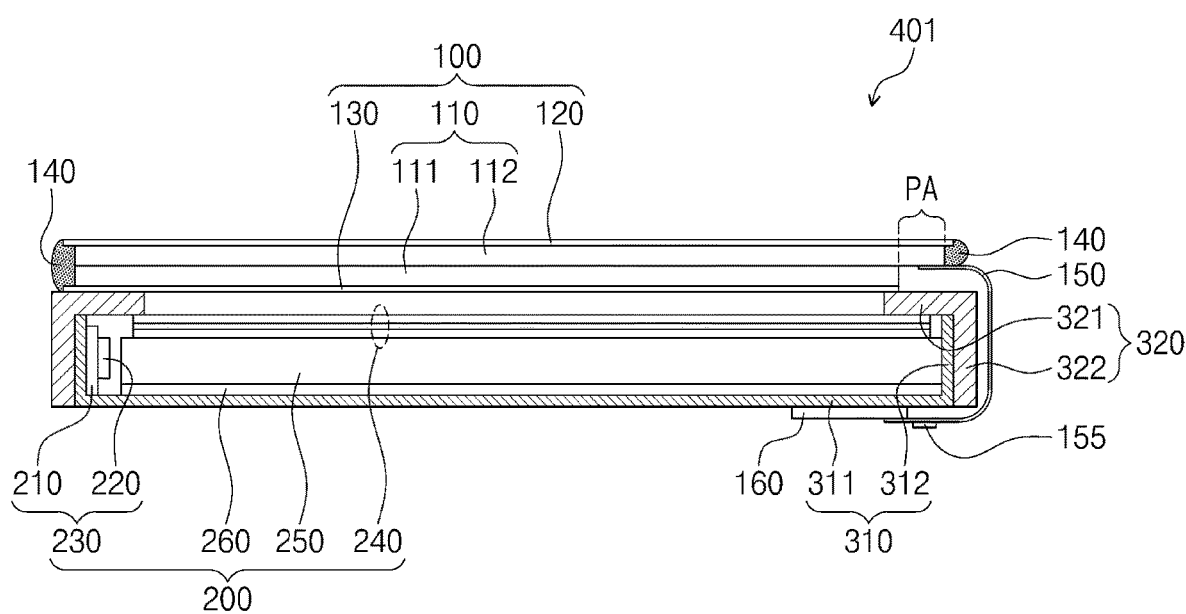
FIG. 8 is a sectional view illustrating a display device according to another exemplary embodiment of the present invention.

FIG. 8 is a sectional view illustrating a display device according to another exemplary embodiment of the present invention.

Referring to FIG. 8, in a display device 401 according to another exemplary embodiment of the present invention, the pad region PA, to which the flexible circuit films 150 are attached, may be defined on the second substrate 112. The second substrate 112 may include an exposed end portion, which extends outwardly beyond the first substrate 111 and is provided near the pad region PA. Thus, the bottom surface of the second substrate 112 may not overlap the first substrate 111 in the pad region PA, and the flexible circuit films 150 may be attached to a region of the bottom surface of the second substrate 112 corresponding to the pad region PA.

In the exemplary embodiment illustrated in FIG. 8, the second substrate 112 may be configured to include a plurality of pixels, and the first substrate 111 may be configured to include a color filter layer for controlling a color of light emitted from each of the pixels.

The flexible circuit films 150 may be bent at the end portion of the second substrate 112 to enclose the extended portion 322 of the second receiving member 320 and may be bent to partially cover a bottom surface of the bottom portion 311 adjacent to the extended portion 322. Because the flexible circuit films 150 is bent, the printed circuit board 160 connected to the flexible circuit films 150 may be positioned below the bottom portion 311 of the first receiving member 310. The driving chips 155, which are respectively mounted on the flexible circuit films 150, may be provided on the rear surface of the bottom portion 311 of the first receiving member 310 and adjacent to the printed circuit board 160.

In the pad region PA, the end portion of the first substrate 111 may be positioned within the second substrate 112 when viewed in a plan view, and the bent portion of the flexible circuit films 150 may partially cover the end portion of the first substrate 111. Thus, the side cover layer 140 in the pad region PA may not be formed on the side surface of the first substrate 111.

However, in the pad region PA, the side surface of the second substrate 112 may be exposed to (or susceptible to) an external impact. Thus, according to some embodiments of the present invention, the side cover layer 140 may be provided to cover the side surface of the second substrate 112 in the pad region PA. Furthermore, to increase the strength of the side cover layer 140, the end portion of the first polarizing plate 120 may extend in an outward direction from the pad region PA. In this embodiment, the side cover layer 140 may be formed to cover the side surface of the second substrate 112 and the side surface of the first polarizing plate 120.

Figure 9:
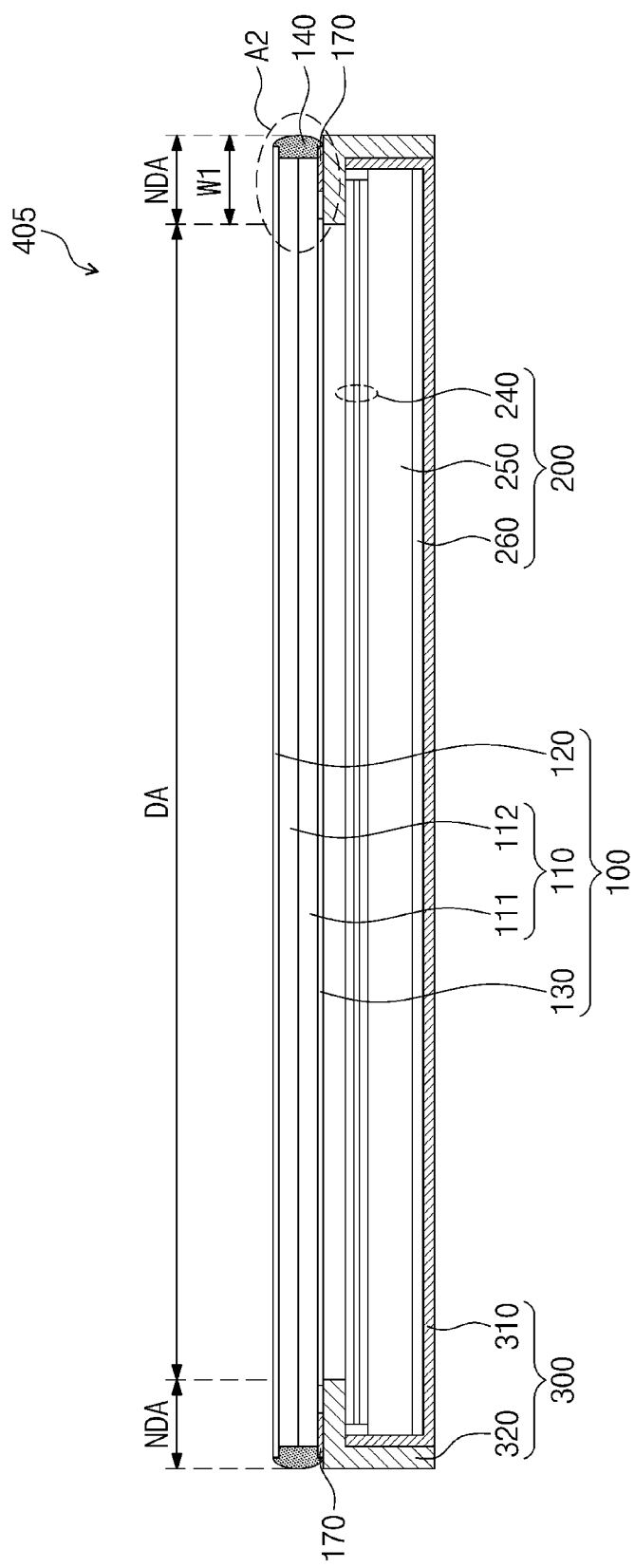
FIG. 9 is a sectional view illustrating a display device according to another exemplary embodiment of the present invention.
Figure 10:
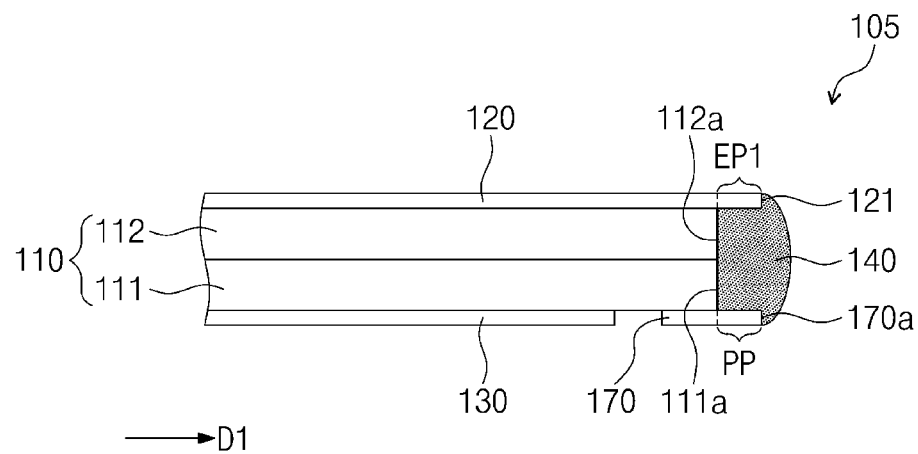
FIG. 10 is an enlarged sectional view illustrating the portion A2 of FIG. 9.

FIG. 9 is a sectional view illustrating a display device according to another exemplary embodiment of the present invention, and FIG. 10 is an enlarged sectional view illustrating the portion A2 of FIG. 9. In the following description of FIGS. 9 and 10, an element having the same reference number as a previously-described with reference to FIGS. 1-8 may not be repeatedly described.

Referring to FIGS. 9 and 10, in a display device 405 according to another exemplary embodiment of the present invention, a display panel module 105 may include the display panel 110, the first polarizing plate 120 attached to the top surface of the display panel 110, and the second polarizing plate 130 attached to the bottom surface of the display panel 110. The display panel module 105 may further include the side cover layer 140 and a supporting layer 170, which supports the side cover layer 140.

The first polarizing plate 120 may be longer than that of the display panel 110 in the first direction D1 to include the first extended portion EP1, which is provided outside the top surface of the display panel 110. The display panel 110 may have a tetragonal or rectangular shape when viewed in a plan view parallel to the first direction D1. The first extended portion EP1 may be formed to extend beyond the top surface of the display panel 110 on three sides of the display panel 110, except for a side provided with the pad region PA.

In some embodiments, a width of the first extended portion EP1 in the first direction D1 may be in a range from about 0.1 mm to about 1 mm.

The second polarizing plate 130 may be smaller than that of the bottom surface of the display panel 110, and thus, an end portion of the second polarizing plate 130 may be positioned inside a periphery of the display panel 110 when viewed in a plan view. The top surface of the display panel 110 may be the top surface of the second substrate 112, and the bottom surface of the display panel 110 may be the bottom surface of the first substrate 111.

The supporting layer 170 may be provided adjacent to the second polarizing plate 130 to support the bottom surface of the display panel 110 and the bottom surface of the side cover layer 140. The supporting layer 170 may include (or may be) an adhesive tape attached to the bottom surface of the display panel 110. The supporting layer 170 may extend beyond the bottom surface of the display panel 110 in the first direction D1 to have a laterally protruding structure. The supporting layer 170 may include a protruding portion PP facing the first extended portion EP1 of the first polarizing plate 120.

In some embodiments, the supporting layer 170 may have a thickness in a range from about 0.05 mm to about 0.3 mm, and a width of the protruding portion PP in the first direction D1 may be in a range from about 0.1 mm to about 1 mm. The width of the protruding portion PP may be substantially equal to or less than that of the first extended portion EP1.

The side cover layer 140 may be provided between the first extended portion EP1 and the protruding portion PP to cover the first side surface 111a of the first substrate 111 and the second side surface 112a of the second substrate 112. The side cover layer 140 may be formed to cover the side surface 121 of the first polarizing plate 120 and a side surface 170a of the supporting layer 170.

In some embodiments, the side cover layer 140 may have a width in a range of about 0.25 mm to about 1 mm in the first direction D1.

The side cover layer 140 may include (or may be formed of) a silicone or UV curable sealing material or resin. In addition, the side cover layer 140 may include a colored material (e.g., a black material) or a light-blocking material, which can prevent or substantially reduce light from leaking through the side surface of the display panel 110.

Figure 11:
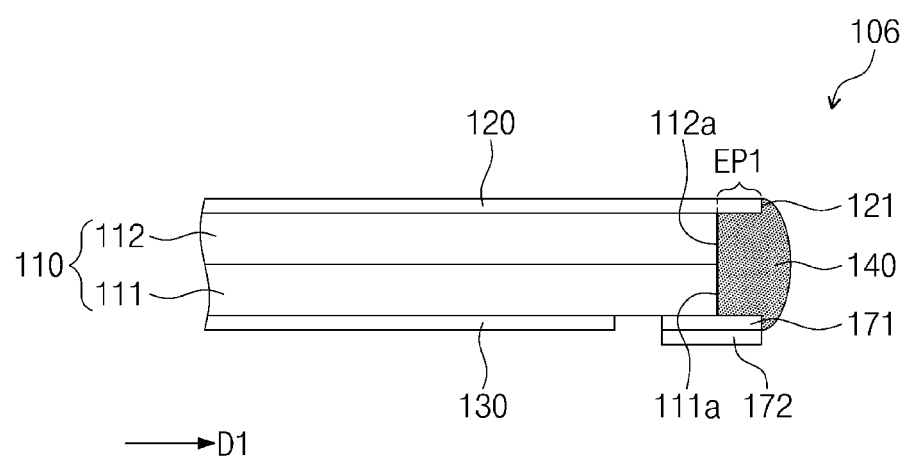
FIG. 11 is a sectional view illustrating a portion of a display panel module according to another exemplary embodiment of the present invention.

FIG. 11 is a sectional view illustrating a portion of a display panel module according to another exemplary embodiment of the present invention.

Referring to FIG. 11, a display panel module 106 according to another exemplary embodiment of the present invention may include a first supporting layer 171 and a second supporting layer 172.

The first supporting layer 171 may include (or may be) a double-sided adhesive tape, which is attached to the bottom surface of the display panel 110 and has first and second adhesive surfaces. The first adhesive surface of the first supporting layer 171 may be attached to the bottom surface of the display panel 110, and the second adhesive surface of the first supporting layer 171 may be attached to the second supporting layer 172. The second supporting layer 172 may include (or may be formed of) at least one of a metallic material (e.g., SUS or aluminum), polycarbonate, acrylic, glass, and so forth.

In some embodiments, the first supporting layer 171 may have a thickness of about 0.05 mm, and the second supporting layer 172 may have a thickness in a range of about 0.1 mm to about 0.3 mm.

The following Table 2 shows numerical results of strength characteristics of display panels according to an Embodiment 2 and a Comparative example. In Embodiment 2, the side cover layer 140 was provided between the first extended portion EP1 and the first supporting layer 171. By contrast, in the Comparative example, only one of the first and second polarizing plates 120 and 130 (e.g., the first polarizing plate 120) had an extended structure, and the side cover layer 140 was provided below the extended portion of the one of the first and second polarizing plates 120 and 130.

TABLE 2

| Ball weight | Height | Energy (mJ) | Comparative example | Embodiment 2 |
|---|---|---|---|---|
| 110 g (50 g) | 2.3 (5) cm | 25 | 0/5 | 0/5 |
| | 6.8 (15) cm | 74 | 0/5 | 0/5 |
| | 11.4 (25) cm | 120 | 1/5 (20%) | 0/5 |
| | 18.2 (40) cm | 196 | 1/5 | 0/5 |
| | 20.5 (45) cm | 221 | 1/5 | 0/5 |
| | 22.7 (50) cm | 245 | — | 0/5 |
| | 25.0 (55) cm | 270 | — | 0/5 |
| | 27.3 (60) cm | 294 | — | 1/5 (20%) |

In Embodiment 2, each of the first extended portion EP1 and the first and second supporting layers 171 and 172 had a width of 0.4 mm, and the side cover layer 140 had a thickness of 0.5 mm. In the Comparative example, the extended portion had the same width as that of the first extended portion EP1, and the side cover layer had a thickness of 0.5 mm.

According to the test results shown in Table 2, the display panel module of Embodiment 2 withstood about 2.75 times the energy before glass breakage compared with the Comparative example.

Figure 12:
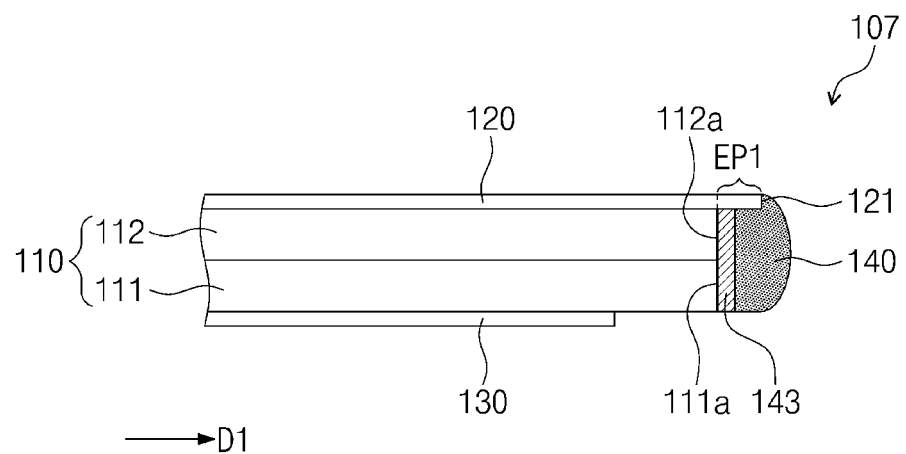
FIG. 12 is a sectional view illustrating a portion of a display panel module according to another exemplary embodiment of the present invention.

FIG. 12 is a sectional view illustrating a portion of a display panel module according to another exemplary embodiment of the present invention.

Referring to FIG. 12, a display panel module 107 may further include the intermediate buffer layer 143 interposed between the side cover layer 140 and the side surface of the display panel 110.

The intermediate buffer layer 143 may be provided below the first extended portion EP1 of the first polarizing plate 120. The intermediate buffer layer 143 may be large enough to cover the first side surface 111a of the first substrate 111 and the second side surface 112a of the second substrate 112 and may be attached to the first side surface 111a and the second side surface 112a.

Thus, a top surface of the intermediate buffer layer 143 may be covered by the first extended portion EP1, and a side surface of the intermediate buffer layer 143 may be covered by the side cover layer 140.

The intermediate buffer layer 143 may include (or may be) an adhesive tape formed of polyethylene terephthalate (PET). For example, the intermediate buffer layer 143 may have a thickness of about 0.2 mm.

The intermediate buffer layer 143 may include a strength enhancing layer, which includes (or is formed of) metal, acrylic, or glass, and an adhesive layer, which attaches the strength enhancing layer to the first and second side surfaces 111a and 112a.

The following Table 3 shows numerical results of strength characteristics of display panels according to an Embodiment 3 and a Comparative example. In Embodiment 3, the intermediate buffer layer 143 and the side cover layer 140 were provided. By contrast, in the Comparative example, only one of the first and second polarizing plates 120 and 130 (e.g., the first polarizing plate 120) had an extended structure, and the side cover layer 140 was provided below the extended portion of the one of the first and second polarizing plates 120 and 130.

TABLE 3

| Ball weight | Height | Energy (mJ) | Comparative example | Embodiment 3 |
|---|---|---|---|---|
| 110 g (50 g) | 2.3 (5) cm | 25 | 0/5 | 0/5 |
| | 6.8 (15) cm | 74 | 0/5 | 0/5 |
| | 11.4 (25) cm | 120 | 1/5 (20%) | 0/5 |
| | 18.2 (40) cm | 196 | 1/5 | 0/5 |
| | 20.5 (45) cm | 221 | 1/5 | 0/5 |
| | 22.7 (50) cm | 245 | — | 0/5 |
| | 25.0 (55) cm | 270 | — | 1/5 (20%) |

In Embodiment 3, the first extended portion EP1 had a width of 0.4 mm, the side cover layer 140 had a thickness of 0.3 mm, and the intermediate buffer layer 143 had a thickness of 0.2 mm. In the Comparative example, the extended portion had the same width as that of the first extended portion EP1, and the side cover layer had a thickness of 0.5 mm.

According to the test results shown in Table 3, the display panel module of Embodiment 3 withstood about 2.5 times the energy before glass breakage compared to the Comparative example.

In Embodiment 3, due to the presence of the intermediate buffer layer 143, the thickness of the side cover layer 140 can be reduced when compared to an embodiment in which the intermediate buffer layer 143 is not provided (or is omitted) while maintaining the same or substantially similar strength characteristics. For example, the thickness of the side cover layer 140 may be reduced from about 0.5 mm to about 0.3 mm. Further, when the thickness of the side cover layer 140 is reduced, it may be possible to reduce a process time to form the side cover layer 140, thereby improving process efficiency in the fabrication process.

Figure 13:
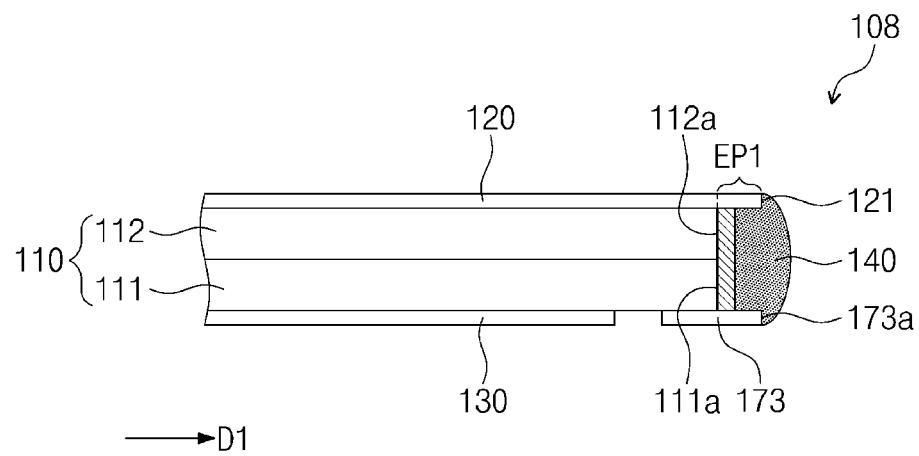
FIG. 13 is a sectional view illustrating a portion of a display panel module according to another exemplary embodiment of the present invention.

FIG. 13 is a sectional view illustrating a portion of a display panel module according to another exemplary embodiment of the present invention.

Referring to FIG. 13, a display panel module 108 according to another exemplary embodiment of the present invention may further include a supporting layer 173 to support the intermediate buffer layer 143 and the side cover layer 140.

The supporting layer 173 may be provided adjacent to the second polarizing plate 130 to support the bottom surface of the display panel 110, the bottom surface of the intermediate buffer layer 143, and the bottom surface of the side cover layer 140. The supporting layer 173 may include (or may be) an adhesive tape attached to the bottom surface of the display panel 110. The supporting layer 173 may include a protruding portion that extends beyond the bottom surface of the display panel 110 and is provided near the first direction D1.

The intermediate buffer layer 143 may be provided between the supporting layer 173 and the first extended portion EP1. The side cover layer 140 may be provided between the first extended portion EP1 and the supporting layer 173 to cover the side surface of the intermediate buffer layer 143, the side surface 121 of the first polarizing plate 120, and a side surface 173a of the supporting layer 173.

In some embodiments, the side cover layer 140 may have a width in a range from about 0.05 mm to about 0.3 mm when measured in the first direction D1.

According to some embodiments of the present invention, first and second polarizing plates may extend outwardly to cover top and bottom surfaces of a side cover layer, thereby increasing strength of an edge portion of a display panel that is covered by the side cover layer.

In addition, a supporting layer may be provided to support the bottom surface of the side cover layer, thereby increasing the strength of the display panel.

An intermediate buffer layer may be additionally provided between the side cover layer and the display panel. Thus, even when a thickness of the side cover layer is reduced by a thickness of the intermediate buffer layer, the strength of the display panel may not be reduced and a process time to form the side cover layer may be reduced.

While example embodiments of the present invention have been particularly shown and described, it will be understood by one of ordinary skill in the art that variations in form and detail may be made therein without departing from the spirit and scope of present invention as defined by the attached claims and their equivalents.

What is claimed is:

1. A display device comprising:
a display panel comprising a first substrate and a second substrate, the first and second substrates being coupled to each other and facing each other, the first substrate having a pad area that extends outwardly beyond an end portion of the second substrate;
a first polarizing plate attached to the second substrate of the display panel, the first polarizing plate having a first extended portion that extends outwardly beyond the end portion of the second substrate;
a second polarizing plate attached to the first substrate of the display panel, the pad area of the first substrate extending outwardly beyond the end portion of the second polarizing plate, the second polarizing plate having a second extended portion that extends outwardly beyond an end portion of the first substrate;
a side cover layer between the first and second extended portions of the first and second polarizing plates and covering a first side surface of the first substrate and a second side surface of the second substrate that are near the first and second extended portions, respectively; and
a flexible circuit film connected to the pad area of the first substrate and bent to enclose the end portion of the first substrate adjacent to pad area,
wherein the side cover layer is not disposed on the first side surface of the first substrate enclosed by the flexible circuit film.

2. The display device of claim 1, wherein the side cover layer covers a side surface of the first extended portion and a side surface of the second extended portion.

3. The display device of claim 1, wherein the side cover layer comprises an ultraviolet light (UV) curable resin and a colored material.

4. The display device of claim 1, wherein a width of each of the first and second extended portion is in a range from 0.1 mm to 1 mm.

5. The display device of claim 4, wherein the side cover layer has a thickness in a range from 0.25 mm to 1 mm.

6. The display device of claim 1, further comprising an intermediate buffer layer between the side cover layer and the first and second side surfaces.

7. The display device of claim 6, wherein the intermediate buffer layer comprises a strength enhancing layer and an adhesive layer attaching the strength enhancing layer to the first and second side surfaces, and wherein the strength enhancing layer comprises at least one of metal, acrylic, or glass.

8. The display device of claim 6, wherein the intermediate buffer layer comprises an adhesive tape attached to the first and second side surfaces.

9. The display device of claim 6, wherein the intermediate buffer layer is on the first and second side surfaces and has a length shorter than a sum of vertical thicknesses of the first and second side surfaces.

10. The display device of claim 6, wherein a top surface of the intermediate buffer layer is covered by the first extended portion,
wherein a side surface of the intermediate buffer layer is covered by the side cover layer, and
wherein a bottom surface of the intermediate buffer layer is covered by the second extended portion.

11. A display device comprising:
a display panel comprising a first substrate and a second substrate, the first and second substrates being coupled to each other and facing each other;
a first polarizing plate attached to the second substrate of the display panel, the first polarizing plate having a first extended portion that extends outwardly beyond an end portion of the second substrate;
a second polarizing plate attached to the first substrate of the display panel;
a supporting layer attached to a portion of the first substrate and adjacent to the second polarizing plate in a first direction, the supporting layer having a protruding portion facing the first extended portion of the first polarizing plate; and
a side cover layer below the first extended portion and covering a first side surface of the first substrate, a second side surface of the second substrate, a side surface of the first extended portion of the first polarizing plate, and a side surface of the supporting layer,
wherein the side cover layer is disposed between the protruding portion of the supporting layer and the first extended portion of the first polarizing plate.

12. The display device of claim 11, wherein the supporting layer comprises:
a first supporting layer attached to a bottom surface of the side cover layer and a bottom surface of the first substrate; and
a second supporting layer attached to a bottom surface of the first supporting layer.

13. The display device of claim 12, wherein the first supporting layer comprises a double-sided adhesive tape, and
wherein the second supporting layer comprises at least one of metal, acrylic, or glass.

14. The display device of claim 11, wherein the supporting layer comprises a single-sided adhesive tape attached to a bottom surface of the side cover layer and a bottom surface of the second substrate.

15. The display device of claim 11, further comprising an intermediate buffer layer between the side cover layer and the first and second side surfaces.

16. The display device of claim 15, wherein the intermediate buffer layer comprises an adhesive tape attached to the first and second side surfaces.

17. The display device of claim 16, wherein the side cover layer has a thickness in a range from 0.05 mm to 0.3 mm.

18. The display device of claim 11, wherein the side cover layer comprises a UV curable resin and a colored material.

19. The display device of claim 11, wherein the first extended portion has a width in a range from 0.1 mm to 1 mm.

20. The display device of claim 11, wherein the side cover layer has a thickness in a range from 0.25 mm to 1 mm.

21. A display device comprising:
- a display panel comprising a first substrate and a second substrate, the first and second substrates being coupled to each other and facing each other, the second substrate having a pad area extending outwardly beyond an end portion of the first substrate;
- a first polarizing plate attached to the second substrate of the display panel, the first polarizing plate having a first extended portion that extends outwardly beyond the end portion of the second substrate;
- a second polarizing plate attached to the first substrate of the display panel, the pad area of the second substrate extending outwardly beyond the end portion of the second polarizing plate, the second polarizing plate having a second extended portion that extends outwardly beyond an end portion of the first substrate;
- a side cover layer between the first and second extended portions of the first and second polarizing plates and covering a first side surface of the first substrate and a second side surface of the second substrate that are near the first and second extended portions, respectively; and
- a flexible circuit film connected to the pad area of the second substrate and bent to enclose an end portion of the first substrate adjacent to pad area, wherein the side cover layer covers a third side surface of the second substrate adjacent the pad area and is disposed between the first extended portion of the first polarizing plate and the flexible circuit film, wherein the side cover layer is not disposed on the first side surface of the first substrate enclosed by the flexible circuit film.

* * * * *